United States Patent Office 2,750,378
Patented June 12, 1956

2,750,378

MONO-AZO-DYESTUFFS INSOLUBLE IN WATER

Ernst Fischer, Offenbach (Main), Germany, assignor to Farbwerke Hoechst A. G. vormals Meister Lucius und Bruning, Frankfurt am Main Hochst, Germany, a German company No Drawing. Application June 27, 1952,
Serial No. 296,067

Claims priority, application Germany June 30, 1951

8 Claims. (Cl. 260—202)

The present invention relates to new mono-azo-dyestuffs insoluble in water; more particularly it relates to dyestuffs corresponding to the following general formula:

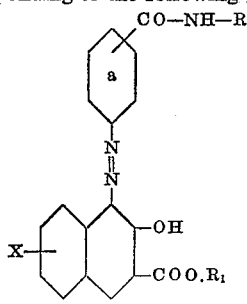

wherein the group —CO—NH—R stands in meta- or para-position to the azo group, the benzene radical "a" may contain further substituents, such as alkyl, alkoxy groups or halogen atoms, X represents hydrogen or halogen, R represents hydrogen, an alkyl, aralkyl, aryl or hydroaromatic radical and $R_1$ represents an alkyl, aralkyl, aryl or hydroaromatic radical.

I have found that water-insoluble mono-azo-dyestuffs suitable as pigment dyestuffs can be obtained by coupling a diazo-compound of an amine corresponding to the general formula:

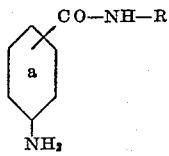

wherein the group —CO—NH—R stands in meta- or para-position to the amino group, the benzene radical "a" may contain further substituents, such as alkyl, alkoxy groups or halogen atoms, and R represents hydrogen, an alkyl, aralkyl, or aryl radical which may contain substituents or a hydroaromatic radical, with an ester of 2.3-hydroxy-naphthoic acid, the coupling components being free from groups imparting solubility in water, such as sulfonic or carboxylic acid groups.

The new dyestuffs yield orange to bluish red and red-brown tints of good fastness properties. They are particularly adapted for coloring plastic masses from organic compounds of high molecular weight, such as condensation products of formaldehyde and urea, phenols or amines, polyvinyl compounds, rubber etc. Furthermore, they may advantageously be used for the preparation of color lakes of good fastness to oil and to light, and, when they are added to the spinning solutions, also for the production of acetate rayon and viscose rayon dyed during the spinning process. When compared with the mono-azo-dyestuffs containing the same diazo-components which are described in German Patents 602,064 and 613,234, the dyestuffs of the present invention bleed much less into uncolored polymerization products from vinyl chloride than the known dyestuffs.

The following examples serve to illustrate the invention, but they are not intended to limit it thereto, the parts being by weight:

Example 1

12.1 parts of 1-amino-2-methoxybenzene-5-carboxylic acid phenylamide are diazotized in the usual manner. In order to remove the excess of the mineral acid, sodium acetate is added to the diazo-solution, which is then poured, while stirring, into a solution of 10.1 parts of 2.3-hydroxynaphthoic acid methyl ester in a dilute solution of caustic soda. When the coupling is complete, the dyestuff formed is filtered with suction, washed well and dried. It is a red powder. The dyestuff corresponds to the following formula:

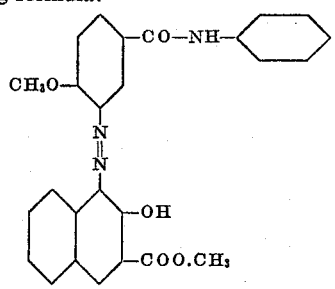

Polymerization products of vinyl chloride can be dyed with this dyestuff in the following manner:

100 parts of a polymerization product of vinyl chloride
50 parts of phthalic acid di-n-butyl ester, acting as plasticizer,
0.3 part of titanium dioxide and
0.45 part of the azo-dyestuff are mixed and then homogenized on the kneading roller for 10 minutes at 140° C. A soft rubber-like mass having a red coloration is obtained which does not bleed into uncolored polymerization product and possesses a good fastness to light. In addition to or instead of titanium dioxide, other fillers normally used for the manufacture of rubber may also be incorporated with the kneading mass.

Example 2

12.7 parts of 1-amino-2-methylbenzene-5-carboxylic acid-(2'.4'-dimethylphenyl)-amide are diazotized in the usual manner. The diazo-solution is rendered neutral to Congo paper with a sodium acetate solution and then stirred into a solution of 10.1 parts of 2.3-hydroxy-naphthoic acid methyl ester in dilute caustic soda solution. The resulting red dyestuff is filtered with suction, washed well, and dried. It can be used for coloring rubber in the following manner: 2 per cent. of the azo-dyestuff are kneaded into a mixture of rubber, fillers, sulfur, and vulcanization accelerator. After hot vulcanization in the press, the mass exhibits a red coloration which possesses a good fastness to light. It neither bleeds nor effloresces into white rubber.

When the mixture of rubber, the usual admixtures and 0.5 per cent. of the azo-dyestuff is dipped into a solution of sulfur chloride in benzine and vulcanized in the cold, a coloration having the same properties is obtained.

Example 3

In the manner described in Examples 1 and 2 a red dyestuff is obtained from the diazo-compound of 13.0 parts of 1-amino-2-chlorobenzene-5-carboxylic acid-(2'-methylphenyl)-amide and 11.5 parts of 2.3-hydroxy-naphthoic acid-n-propyl ester. Color lakes prepared with this dyestuff yield red colorations of good fastness to oil and to light.

The coupling operation may also be carried out in the presence of a substratum adapted for the preparation of color lakes.

*Example 4*

The dyestuff obtained as described in Example 1 from 13.0 parts of 1-amino-2-chlorobenzene-5-carboxylic acid-(2'-methylphenyl)-amide and 12.2 parts of 2.3-hydroxy-naphthoic acid-n-butyl ester is a red powder which can be used for dyeing polymerization products of vinyl chloride, in the manner described in that example, orange tints having a good fastness to light. The dyeings do not bleed into uncolored polymerization product.

If copolymers of vinyl chloride and acrylic acid methyl ester or of vinyl chloride and vinyl acetate are used instead of polyvinyl chloride, dyeings having the same tint and similar good fastness properties are obtained.

*Example 5*

If in Example 2 10.8 parts of 2.3-hydroxy-naphthoic acid ethyl ester are used instead of 10.1 parts of 2.3-hydroxy-naphthoic acid methyl ester, a dyestuff of a similar tint is obtained. 0.5 part of this dyestuff is added to 100 parts of the condensation product of urea and formaldehyde containing as a filler 30 per cent. of sawdust. This mixture is ground for 12 hours in the ball mill. Thereupon the mass is introduced into a press, in which it is pressed and hardened within 5 minutes at 140° C., to form the desired moulded body.

The following table indicates a number of further components which may be used according to the present invention and the tints of the mono-azo-dyestuffs thus obtained, which likewise possess good fastness properties.

| Diazo-Component | Coupling-Component | Tint |
|---|---|---|
| 1-amino-2-methoxybenzene-5-carboxylic acid- | 2.3-hydroxy-naphthoic acid- | |
| (1) (4'-chlorophenyl)-amide | ethyl ester | red. |
| (2) (4'-chlorophenyl)-amide | isobutyl ester | Do. |
| (3) (4'-chlorophenyl)-amide | isohexyl ester | Do. |
| (4) (4'-chlorophenyl)-amide | cyclohexyl ester | Do. |
| (5) (2'-methoxy-4'-chlorophenyl)-amide | ethyl ester | Do. |
| (6) (2'-naphthyl)-amide | do | Do. |
| (7) (4'-diphenyl)-amide | do | bluish red. |
| (8) (2'-phenoxy-4'-chlorophenyl)-amide | methyl ester | Do. |
| (9) benzyl-amide | ethyl ester | red. |
| (10) (4'-bromophenyl)-amide | do | Do. |
| (11) amide | isobutyl ester | Do. |
| (12) cyclohexyl-amide | do | Do. |
| 1-amino-2.4-dimethoxybenzene-5-carboxylic acid- | | |
| (13) phenyl-amide | do | Do. |
| 1-amino-2-ethoxybenzene-5-carboxylic acid- | | |
| (14) ethyl amide | n-butyl ester | Do. |
| (15) isobutyl-amide | n-propyl ester | Do. |
| (16) (2'-methyl-3'-chlorophenyl)-amide | ethyl ester | Do. |
| 1-amino-benzene-3-carboxylic acid- | | |
| (17) (3'.4'-dichlorophenyl)-amide | do | red-orange |
| (18) (4'-chlorophenyl)-amide | do | Do. |
| (19) amide | do | Do. |
| (20) n-butyl-amide | n-butyl ester | Do. |
| 1-amino-benzene-4-carboxylic acid- | | |
| (21) amide | ethyl ester | Do. |
| (22) (4'-diphenyl)-amide | do | brown-orange. |
| 1-amino-3-methylbenzene-4-carboxylic acid- | | |
| (23) phenyl-amide | do | red-orange. |
| 1-amino-2.5-dimethoxybenzene-4-carboxylic acid- | | |
| (24) phenyl-amide | isobutyl ester | red-brown. |
| (25) (4'-diphenyl)-amide | methyl ester | Do. |
| 1-amino-2-methylbenzene-5-carboxylic acid- | | |
| (26) (2'-methylphenyl)-amide | do | yellowish red. |
| (27) n-propyl-amide | n-butyl ester | Do. |
| (28) benzyl-amide | ethyl ester | red-orange. |
| 1-amino-2-bromobenzene-5-carboxylic acid- | | |
| (29) (3'.4'-dichlorophenyl)-amide | do | orange. |
| 1-amino-2-chlorobenzene-5-carboxylic acid- | | |
| (30) (2'-methylphenyl)-amide | do | Do. |
| (31) (2'-methylphenyl)-amide | isopropyl ester | Do. |
| (32) (2'-methylphenyl)-amide | amyl ester | Do. |
| (33) (2'-methylphenyl)-amide | n-hexyl ester | Do. |
| (34) (2'-methylphenyl)-amide | benzyl ester | Do. |
| (35) (2'-methylphenyl)-amide | cyclohexyl ester | Do. |
| 1-amino-chlorobenzene-5-carboxylic acid- | 2.3hydroxy-naphthoic acid- | |
| (36) (2'-methylphenyl)-amide | (4'-chloro)-phenyl ester. | orange. |
| (37) (2'.5'-dichlorophenyl)-amide | phenyl ester | Do. |
| (38) (4'-methylphenyl)-amide | methyl ester | Do. |
| (39) phenyl-amide | do | Do. |
| (40) phenyl-amide | ethyl ester | Do. |
| (41) (2'-chlorophenyl)-amide | do | Do. |
| 1-amino-2-methoxybenzene-5-carboxylic acid- | 6-bromo-2.3-hydroxy-naphthoic acid- | |
| (42) (2'-methyl-3'-chlorophenyl)-amide | ethyl ester | bluish red. |
| 1-amino-2-chlorobenzene-5-carboxylic acid- | | |
| (43) (3'-chlorophenyl)-amide | do | orange. |
| 1-amino-2.5-dimethoxybenzene-4-carboxylic acid- | | |
| (44) (4'-diphenyl)-amide | do | red-brown. |

I claim:

1. The mono-azo-dyestuffs insoluble in water corresponding to the following general formula

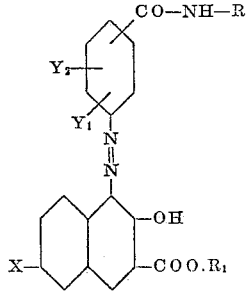

wherein the group —CO—NH—R stands in one of the positions meta and para to the azo group, X stands for one of the group consisting of hydrogen and bromine, $Y_1$ and $Y_2$ stand for members of the group consisting of hydrogen, methyl, lower alkoxy, chlorine and bromine, R stands for a member of the group consisting of hydrogen, lower alkyl, benzyl, aryl and cyclohexyl and $R_1$ represents a member of the group consisting of lower alkyl, benzyl, aryl and cyclohexyl.

2. The mono-azo-dyestuffs insoluble in water corresponding to the following general formula

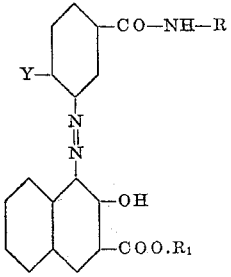

wherein Y stands for a member of the group consisting of hydrogen, methyl, lower alkoxy, chlorine and bromine, R stands for a member of the group consisting of hydrogen, lower alkyl, benzyl, aryl and cyclohexyl and $R_1$ represents a member of the group consisting of lower alkyl, benzyl, aryl and cyclohexyl.

3. The mono-azo-dyestuffs insoluble in water corresponding to the following general formula

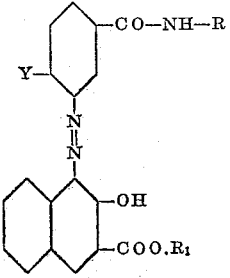

wherein Y stands for a member of the group consisting of hydrogen, methyl, lower alkoxy, chlorine and bromine, R stands for a radical of the benzene series and $R_1$ stands for lower alkyl.

4. The mono-azo-dyestuff insoluble in water corresponding to the following formula

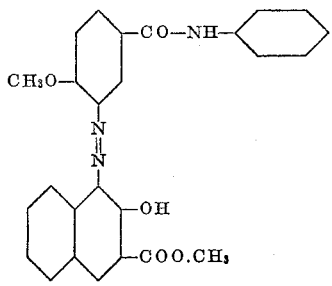

5. The mono-azo-dyestuff insoluble in water corresponding to the following formula

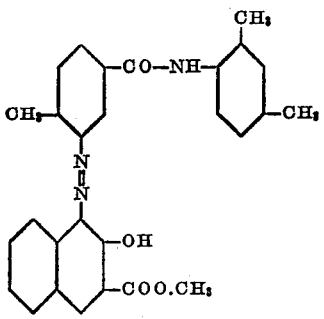

6. The mono-azo-dyestuff insoluble in water corresponding to the following formula

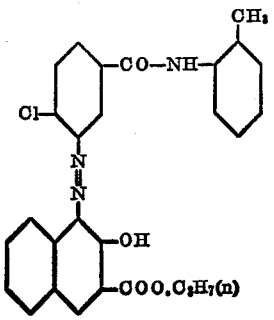

7. The mono-azo-dyestuff insoluble in water corresponding to the following formula

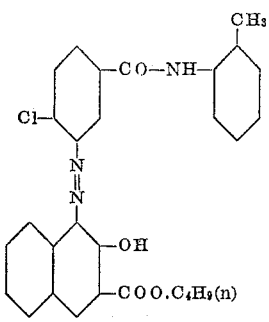

8. The mono-azo dyestuff insoluble in water corresponding to the following formula

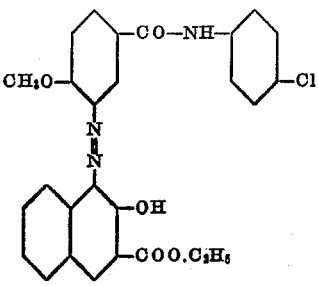

References Cited in the file of this patent

UNITED STATES PATENTS

| | | |
|---|---|---|
| 1,283,231 | Levinstein | Oct. 29, 1918 |
| 2,006,211 | Fischer | June 25, 1935 |
| 2,064,332 | Zwilgemeyer | Dec. 15, 1936 |

FOREIGN PATENTS

| | | |
|---|---|---|
| 602,064 | Germany | Aug. 31, 1934 |
| 424,365 | Great Britain | Feb. 20, 1935 |
| 613,234 | Germany | May 14, 1935 |